United States Patent [19]

Kimberlin

[11] 4,249,404

[45] Feb. 10, 1981

[54] FLOOR MOUNTED SHIFT CONTROL MECHANISM FOR A TRANSMISSION

[75] Inventor: Dan R. Kimberlin, Frankenmuth, Mich.

[73] Assignee: General Motors Corporation, Detroit, Mich.

[21] Appl. No.: 11,395

[22] Filed: Feb. 12, 1979

[51] Int. Cl.³ .................... B60R 25/06; E05B 65/12
[52] U.S. Cl. ........................... 70/248; 70/201; 70/254; 74/878; 74/477; 74/535; 180/287
[58] Field of Search ............... 70/247, 245, 254, 192, 70/193, 195–198, 201; 74/850, 878, 483 R, 473 P, 477, 535; 180/287

[56] References Cited

U.S. PATENT DOCUMENTS

| | | | |
|---|---|---|---|
| 1,480,323 | 1/1924 | White | 70/201 |
| 1,699,398 | 1/1929 | Lach | 70/201 X |
| 2,147,613 | 2/1939 | Sandberg | 70/254 X |
| 2,156,355 | 5/1939 | Sandberg | 70/201 X |
| 3,217,558 | 11/1965 | Schroter | 74/535 X |
| 3,465,559 | 9/1969 | Rhodes et al. | 70/248 |

Primary Examiner—William E. Lyddane
Attorney, Agent, or Firm—Donald F. Scherer

[57] ABSTRACT

A transmission shift control mechanism has a pivotally mounted shift lever and bracket on which is pivotally mounted a lock pawl. A lock lever is pivotally mounted on the same axis as the shift lever and bracket and has an abutment surface thereon which is maintained in contact with a cam surface on the lock pawl. The shift lever and bracket and the lock lever are operatively connected by a spring. The lock lever is connected to the vehicle steering column by a cable mechanism such that the lock lever is maintained stationary when the steering column is locked whereupon pivotal movement of the shift lever and bracket results in relative movement between the lock pawl and abutment surface causing engagement between the lock pawl and the stationary latch member whereby further pivoting of the shift lever and bracket is prevented.

2 Claims, 4 Drawing Figures

FLOOR MOUNTED SHIFT CONTROL MECHANISM FOR A TRANSMISSION

This invention relates to transmission shift control mechanisms and more particularly to floor mounted shift control mechanisms that are locked when the steering column is locked.

The present invention is used with console or floor mounted shift control mechanisms wherein a backdrive connection is made between the shift control mechanism and the steering column and a separate drive transmitting connection is provided between the shift control mechanism and the vehicle transmission. The backdrive connection with the steering column is held stationary by the steering column when the steering column is locked such that initial movement of the shift control mechanism causes engagement between a locking pawl and a stationary portion of the shift control mechanism so that the drive transmitting connection with the transmission cannot be moved sufficiently to cause the transmission control to be moved from the "Park" position. Thus, when the steering column is locked, neither a forward nor reverse drive ratio can be established in the transmission after the transmission has been placed in the Park mode.

It is therefore an object of this invention to provide an improved floor mounted manual shift control mechanism for a transmission wherein the manual shift lever is latched to a stationary member upon initial movement of the manual shift lever when the steering column is locked.

It is another object of this invention to provide an improved floor mounted shift control mechanism for a transmission wherein a manual lever and bracket is mounted for pivotal movement and a lock pawl having a cam surface thereon is pivotally mounted on the manual lever and bracket with the cam surface contacting an abutment on a lock lever which is operatively connected to the steering column by a cable whereby the lock lever is held stationary when the steering column is locked so that the lock pawl will be pivoted relative to the manual lever and bracket to engage a stationary member thus preventing the manual shift lever and bracket from being moved from the "Park" position.

These and other objects and advantages of the present invention will be more apparent from the following description and drawings in which.

Figure 1:
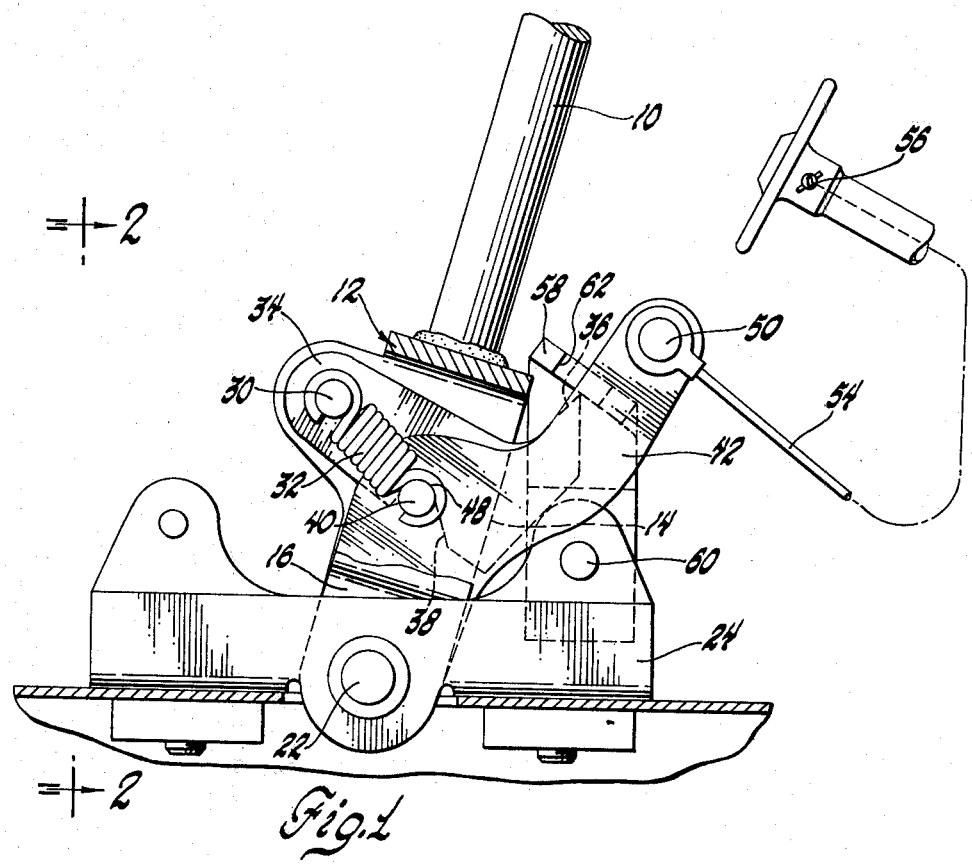
FIG. 1 is an elevational view partly in section of a shift control mechanism.
Figure 2:
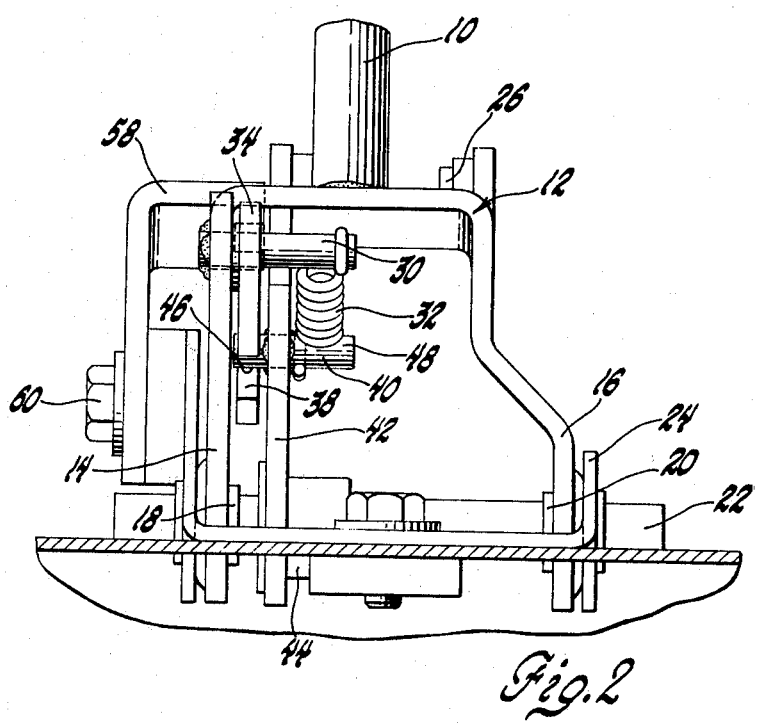
FIG. 2 is a view taken along line 2—2 of FIG. 1.

Referring to the drawings, wherein like characters represent the same or corresponding parts throughout the several views, there is seen a lever 10 which is welded or otherwise secured to a bracket 12 having a pair of upstanding legs 14 and 16 which have secured thereto bearing members 18 and 20, respectively. A pin 22 is secured to a stationary bracket 24 and pivotally supports the bracket 12 through the bearings 18 and 20. The upstanding leg 16 has a pin portion 26 which is connected to one end of a conventional drive transmitting cable 28, the other end of cable 28 is connected to a conventional transmission shift control valve, not shown. The upstanding leg 14 has secured thereto a pin member 30 to which is connected a coil spring 32 and on which is pivotally disposed a lock pawl 34. The lock pawl 34 is generally L-shaped and has a pawl tooth 36 formed thereon and also has a cam surface 38 formed thereon.

The cam surface 38 is in contact with a pin 40 which extends through a lock lever 42 which is also pivotally mounted on the pin 22 by a bearing 44. Thus, the lock lever 42 and the bracket 12 are disposed to pivot about the same axis, that is, the axis of pin 22. The pin 40 has an abutment surface 46 which contacts the cam surface 38 and a spring connecting surface 48 which is connected with the spring 32 to provide a resilient and yieldable drive connection between the bracket 12 and the lock lever 42. The lock lever 42 is drivingly connected through a pin 50 to one end of a conventional drive transmitting cable 54, the other end of which is connected to a conventional steering column mounted locking mechanism 56 which may be constructed in accordance with the locking mechanism shown in U.S. Pat. No. 3,648,490 issued to Kimberlin et al Mar. 14, 1972, or in accordance with many of the conventional steering column locking mechanisms currently used for automotive vehicles.

As is well known with these types of locking mechanisms, when the locking mechanism is in the "Lock" position, the steering wheel cannot be rotated and the transmission backdrive mechanism is held stationary.

A latch member 58 is secured to the stationary bracket 24 by a fastener 60 and has formed therein a latch opening 62 which is disposed, as seen in FIG. 1, directly above pawl tooth 36.

Figure 3:
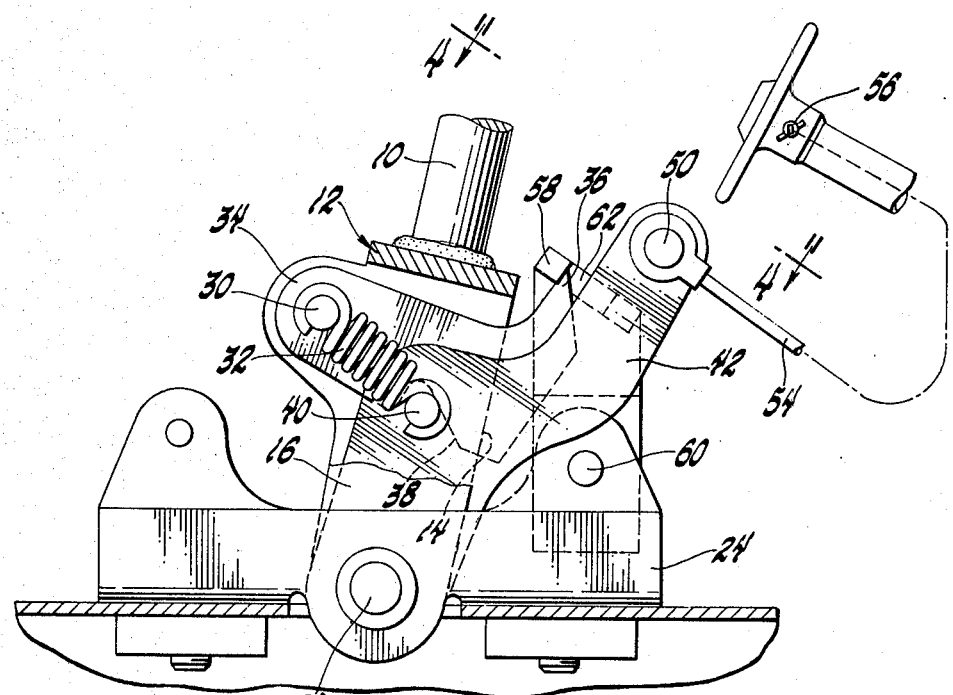
FIG. 3 is an elevational view similar to FIG. 1 showing the shift mechanism in the locked condition.
Figure 4:
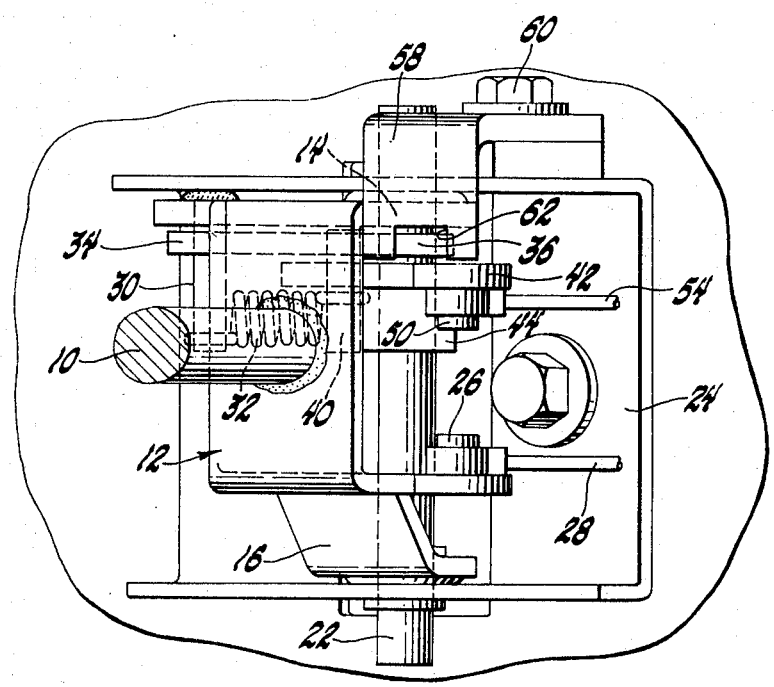
FIG. 4 is a view taken along line 4—4 of FIG. 3.

When the steering column lock mechanism 56 is in the "Lock" position, the lock lever is held against pivotal movement about pin 22 by the cable 54. If, at this time, the manual lever 10 and bracket 12 are pivoted by the operator, the cam surface 38 will be moved relative to the abutment surface 46 thereby causing the lock pawl 34 to pivot about pin 30 so that the pawl tooth 36 will engage in the opening 62, as shown in FIG. 3. Since the cam surface 38 provides a rapid pivoting of lock pawl 34, only slight movement of the manual lever 10 is required to effect the above described latching of the pawl tooth 36. This slight pivotal movement of manual lever 10 is not sufficient to create enough movement of cable 28 to change the transmission control from the Park mode to a Drive mode. Once the pawl tooth 36 is engaged in the opening 62, further pivoting of the manual lever in a counterclockwise direction, as viewed in FIG. 3, is prevented since the bracket 12 is effectively connected to the stationary bracket 24 through the latch member 58. If, however, the steering lock mechanism 56 is moved to an operating position, the lock lever 42 will move in unison with the manual lever 10 and bracket 12 because of the connection of spring 32 therebetween so that relative pivoting of the lock pawl 34 will not occur. Since the manual lever 10 is connected to the stationary bracket 24 when the steering column lock mechanism is in the "Lock" position, the manual effort imposed upon the shift lever 10 other than that sufficient to pivot the lock pawl 34 is not transmitted to either drive cable 28 or 54 thereby preventing high manual efforts from being imposed upon these drive cables. Thus, the drive cables 28 and 54 cannot be stretched sufficiently to pull the transmission control from the Park mode when unauthorized operation of the vehicle is attempted.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A floor mounted transmission shift control and lock mechanism for a vehicle having a steering column with a lock comprising; bracket means secured to the vehicle, a shift control lever pivotally mounted on said bracket means, a lock lever pivotally mounted on said bracket means and operatively connected to the lock on the steering column to be held stationary thereby when the column is locked, a spring means for interconnecting said levers such that said levers will normally move in unison when the steering column is unlocked and the spring means permitting movement of said shift control lever relative to said lock lever when the steering column is locked, and a lock pawl means pivotally connected to said shift control lever having a cam surface engageable with an abutment on said lock lever such that pivotal movement of said shift control lever relative to said lock lever when the steering column is locked will actuate in said lock pawl to engage said bracket means to prevent further pivotal movement of the shift control lever relative to said bracket means.

2. A floor mounted transmission shift control and lock mechanism for a vehicle having a steering column with a multiposition lock mechanism; said shift control and lock mechanism comprising; a manual lever and bracket means pivotally mounted on the vehicle for manual control of a power transmission; actuating lever means pivotally mounted on the vehicle for movement independent from said manual lever and bracket means; spring means connecting said manual lever and bracket means with said actuating lever means for urging unitary movement of said actuating lever means and said manual lever and bracket means; force transmitting means for connecting said actuating lever means with the multiposition lock mechanism, said actuating lever means being inhibited from movement by said force transmitting means when the multiposition lock mechanism is locked; latch means secured to the vehicle; and latch lever means pivotally mounted on said manual lever and bracket means and having a cam surface operatively connected with said actuating lever means for enforcing pivoting of said latch lever means into engagement with said latch means when said actuating lever means is inhibited from movement by said force transmitting means and pivoting of said manual lever and bracket means is attempted by the operator thereby effectively connecting said manual lever and bracket means to the vehicle to prevent pivoting of said manual lever and bracket means, said manual lever and bracket means and said actuating lever means being pivoted in unison when the multiposition lock mechanism is unlocked.

* * * * *